J. TOKASH.
FLYTRAP.
APPLICATION FILED NOV. 25, 1919.

1,352,562.

Patented Sept. 14, 1920.

Witnesses

Inventor
Julia Tokash
By Victor J. Evans
Attorney

UNITED STATES PATENT OFFICE.

JULIA TOKASH, OF McDOWELL, WEST VIRGINIA.

FLYTRAP.

1,352,562.  Specification of Letters Patent.  Patented Sept. 14, 1920.

Application filed November 25, 1919. Serial No. 340,634.

*To all whom it may concern:*

Be it known that I, JULIA TOKASH, a citizen of the United States, residing at McDowell, in the county of McDowell and State of West Virginia, have invented new and useful Improvements in Flytraps, of which the following is a specification.

This invention relates to improvements in fly traps, the object of the invention being to provide an improved fly trap which is simple in construction, can be readily emptied and cleaned, which is sightly in appearance, and which requires but little attention.

The invention consists in the construction, combination and arrangement of devices hereinafter described and claimed.

In the accompanying drawings:—

Figure 1:
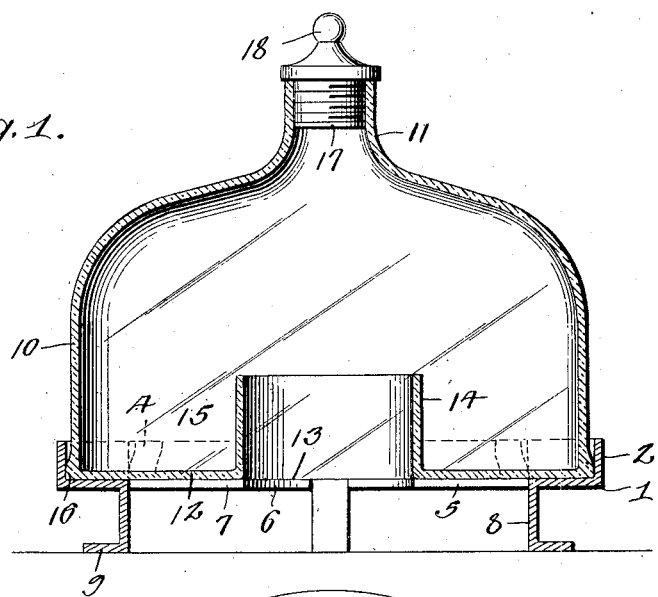
Figure 1 is a vertical central sectional view of a fly trap constructed and arranged in accordance with my invention.
Figure 2:
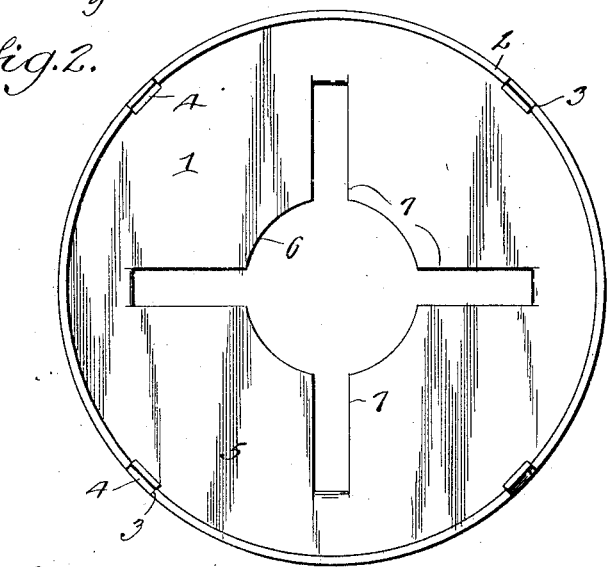
Fig. 2 is a plan view of the base.
Figure 3:
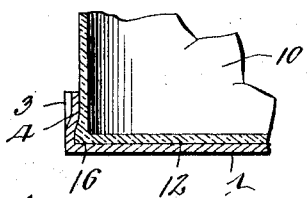
Fig. 3 is a detailed sectional view, showing a portion of the base and of the body of the trap and showing one of the spring clamping arms with which the base is provided.

In accordance with my invention I provide a base 1 which is circular, and which is made of suitable material, preferably aluminum. The base is formed with an integral upwardly extending flange wall 2 which extends therearound and the said flange wall is slitted as at 3 to form integral clamping arms 4 which are curved inwardly and upwardly and project inwardly at their upper ends from the flange wall. The bottom 5 of the base is provided with a central circular opening 6 and also with radial slots 7 which communicate with said opening, the material which is displaced in forming the slots being turned downwardly at the outer ends of the slots and forming supporting legs 8 for the base, the lower ends of the supporting legs being bent outwardly to form feet 9.

The trap also comprises a body 10 which is preferably made of glass and is transparent and is substantially dome-shaped and is formed with a neck 11 and with a bottom 12, a central opening 13 in the bottom to register with the opening 6 of the base, and is also formed with an inner circular wall 14 of suitable height around the opening 13. Thereby an annular basin 15 is formed in the lower side of the body and in which basin poisoned and sweetened water or other liquid or material may be placed to attract and destroy flies. Around the bottom of the body is an annular outstanding flange 16 which fits within the flange wall 2 of the base and is engaged by the clamping arms 4, the said clamping arms serving to hold the body on the base against casual detachment therefrom but permitting the body to be detached from the base when this is desired.

A plug 17 is provided for the neck of the body, which is threaded to screw therein, and is formed at the top with a knob 18. The plug with its knob may be used for lifting and carrying the trap from place to place as will be understood.

It will be understood that flies, being attracted by the bait in the body of the trap, will enter the trap from below and through the opening 13. The trap can be readily emptied and cleaned from time to time and requires very little attention.

While I have herein shown and described a preferred form of my invention, I would have it understood that changes may be made in the form, proportion and construction of the several parts without departing from the spirit of my invention and within the scope of the appended claim.

Having thus described my invention, I claim:—

In a fly trap, a supporting annular base provided with an upwardly extending flange, clamping arms formed upon said flange, a central opening and radial slots in said base, the material cut from said slots being bent downwardly and flanged to form legs for said base; a transparent dome like container supported on said base and having an upwardly extending circular wall in communication with the opening in said base, an annular bead formed upon said container, to be engaged by the clamping arms formed upon the flanged wall, said clamping arms being bent inwardly and upwardly to overlie said bead, and to extend a slight distance upon the walls of the container thereby preventing the casual detachment thereof.

In testimony whereof I affix my signature.

JULIA TOKASH.